March 23, 1926.  1,577,725
F. JONES
TROUGH BELT CONVEYER
Filed Sept. 7, 1923   2 Sheets-Sheet 1

Frank Jones, Inventor
By Barnett & Truman
Attorneys.

March 23, 1926. 1,577,725
F. JONES
TROUGH BELT CONVEYER
Filed Sept. 7, 1923 2 Sheets-Sheet 2
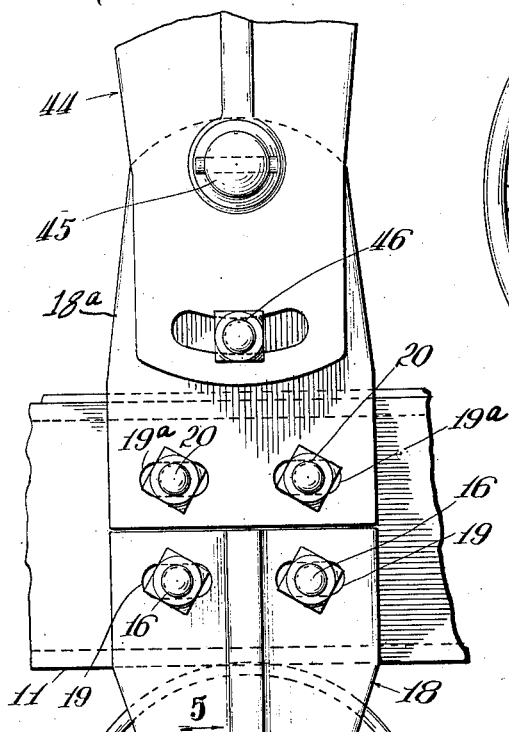
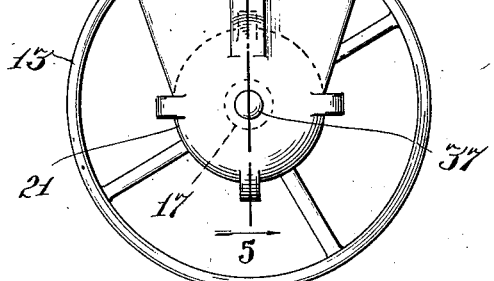
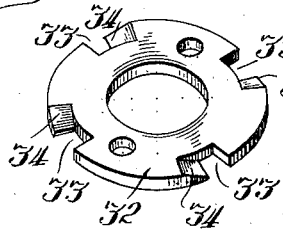
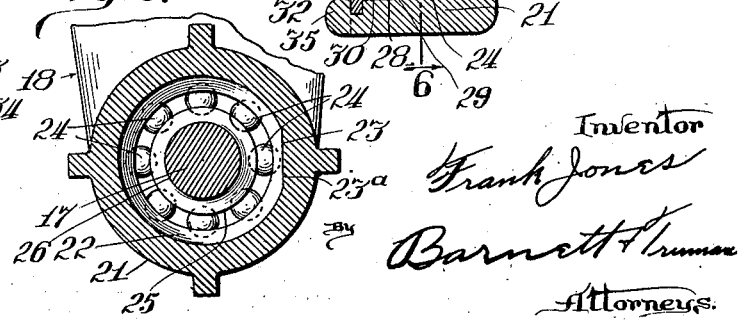
Inventor
Frank Jones
By Barnett & Truman
Attorneys Patented Mar. 23, 1926.

1,577,725

UNITED STATES PATENT OFFICE.

FRANK JONES, OF SALT LAKE CITY, UTAH, ASSIGNOR, BY MESNE ASSIGNMENTS, OF ONE-HALF TO INLAND ENGINEERING COMPANY, A CORPORATION OF ILLINOIS.

TROUGH BELT CONVEYER.

Application filed September 7, 1923. Serial No. 661,398.

*To all whom it may concern:*

Be it known that I, FRANK JONES, a citizen of the United States, residing at Salt Lake City, in the county of Salt Lake and State of Utah, have invented certain new and useful Improvements in Trough Belt Conveyers, of which the following is a specification.

My invention relates to a trough belt conveyer and has for its primary object the provision of an improved conveyer of this character which may be manufactured at a minimum cost and which is so constructed as to reduce the friction between the belt and the supporting rollers and spindle on which they are mounted so as to maintain high efficiency in the operation of the apparatus.

A more specific object of the invention is to provide improved supporting means for the trough portion of the conveyer belt which may be readily adjusted to maintain the belt in proper alignment during its operation.

Another object is to provide the belt supporting rollers of the conveyer with improved bearing members and means for protecting the bearings from dust or other foreign matter and against the loss of lubricant.

The invention further contemplates an improved oiling system for apparatus of this character whereby the bearings of the belt supporting rollers may be thoroughly and uniformly lubricated by the introduction of the lubricant under pressure.

The invention has for further objects such new and improved constructions, arrangements and combinations of parts and devices relating to belt conveyer apparatus as will be hereinafter described and claimed for carrying out the above stated objects and such other objects as will appear from the following detail description of a preferred embodiment of the invention as illustrated in the accompanying drawings:

Fig. 3 is an end view of the roller supporting means taken on line 3, 3 of Fig. 1, showing the means whereby the upper and lower rollers may be alined one with the other and the means for tilting the upper rollers longitudinally of the belt.

Fig. 4 is a cross-sectional view taken on line 4, 4 of Fig. 1, showing my preferred form of device for sealing the bearings of the rollers against the entrance of foreign matter and for retaining the several parts of the said bearings in proper position.

Fig. 5 is a sectional view taken on line 5, 5 of Fig. 3 illustrating the detail construction of the bearing at this point.

Fig. 6 is a sectional view taken on line 6, 6 of Fig. 5 and

Fig. 7 is a view in perspective of the bearing closure cap as shown in Figs. 2 to 6 inclusive.

Like characters of reference designate corresponding parts throughout the several figures of the drawings.

Figure 1:
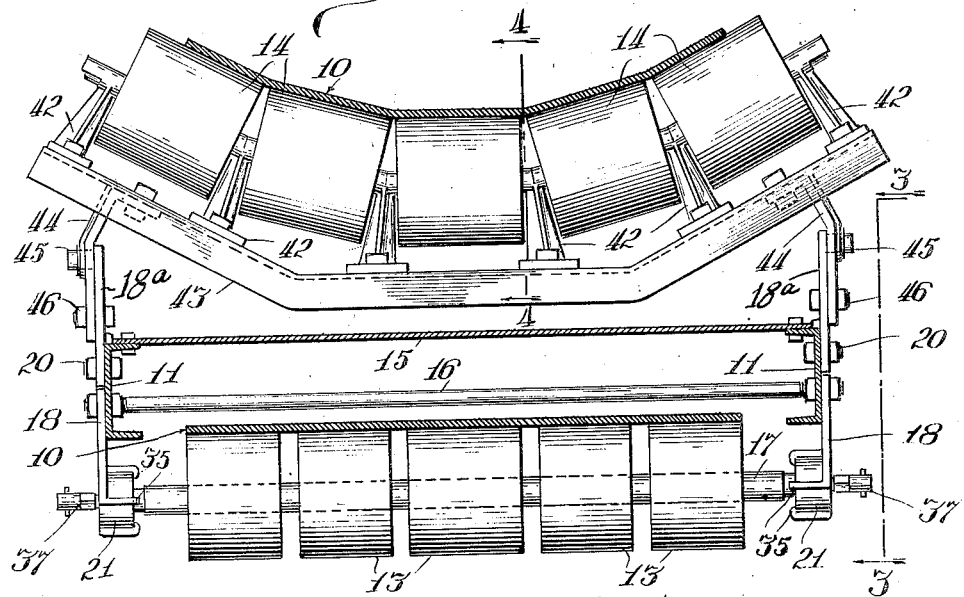
Fig. 1, is a cross-sectional view of a trough belt conveyer constructed in accordance with my invention.
Figure 2:
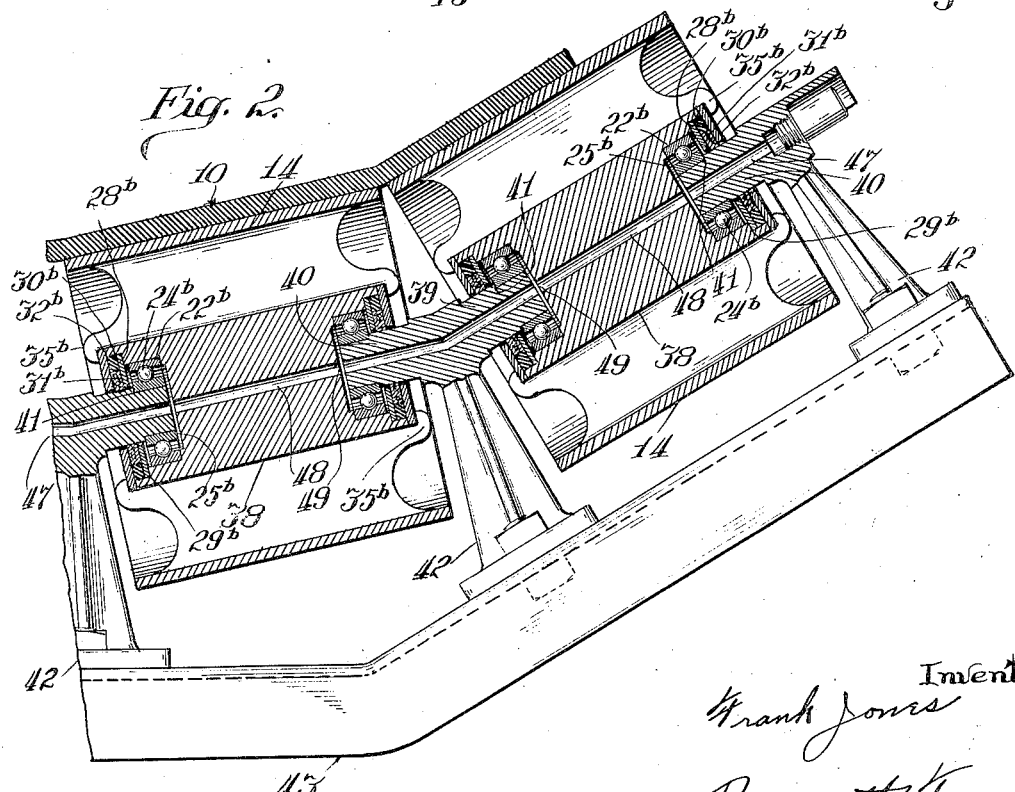
Fig. 2 is a sectional view through the upper rollers at one end of the structure shown in Fig. 1, this figure being illustrated on a larger scale.

My improved trough belt conveyer may be described generally as consisting of an endless flexible belt 10 of any suitable length and width, a main frame 11, a plurality of aligned supporting rolls 13 for supporting the lower strand of the belt and a plurality of angularly disposed supporting rolls 14 for supporting the upper strand of the belt; the supporting rolls 14 being supported at such an angle to each other as to support the edge of the belt above the center thereof and thereby provide it with a trough configuration.

The main frame consists, preferably of parallel channel members 11—11 extending longitudinally of the belt 10 and secured together by means of cross-braces 15 bolted or otherwise suitably secured to the upper flanges of the channel members of the frame and by adjustable braces 16.

The rollers 13 are, preferably, fixed in spaced relation to each other on a shaft 17 and supported below the frame 11 by means of hanger brackets 18. These brackets are, preferably, provided with elongated openings 19, which receive the ends of the adjustable braces 16. These elongated openings permit the brackets 18—18 to be adjusted longitudinally of the frame 11 so that the shaft 17 and rollers 13 may be accurately positioned transversely to the belt. Furthermore, by adjusting the braces 16, the lower edges of the channel members may be drawn inwardly or forced outwardly, as the case may be, and thereby move the lower ends of the brackets 18—18 in a direction transversely of the belt so as to accurately align the integral bearing portions 21 thereof with the shaft 17. This range of adjustment makes it practical to form the hanger brackets 18—18 with integral bearing portions 21, thereby obtaining the advantage of rigidity of construction and economy in the manufacture thereof, and at the same time avoid undesirable friction such as may result from binding or improper alignment of the shaft 17 in the bearing portion of the hanger brackets.

In order to further reduce the friction on the shaft 17, the ends of the shaft are supported in roller bearing members incased in the bearing housings 21 of the hangers 18—18. These roller bearings may be of any suitable or preferred construction. In the drawings these bearings are illustrated, for the purpose of convenience, as being of the general ball bearing type comprising an outer ball race 22 fitted in the cavity of the hanger bracket and held against rotation by means of cooperating flat surface 23 and 23$^a$ on the said ball races and bracket hangers respectively. The balls 24 are positioned, in the usual manner, between the ball race 22 and an inner ball race 25. The inner ball race fits tightly on a reduced portion 26 of the shaft 17 and abuts against a thrust shoulder 27 of the shaft. The ball bearings are retained in place in the bearing housing 21 and protected from dust and other undesirable foreign matter by means of a plurality of retaining and sealing members. These retaining and sealing members consist, preferably, of a metal washer 28 which seats against a shoulder 29 of the bearing housing to hold the ball races in place. A resilient, preferably rubber, washer 30 and a washer 31 of felt or other soft material, concentric therewith, are arranged against the outer face of the metal washer 28 and are held in place by the retaining member 32. This retaining member 32, consists of a washer formed with slots 33 having one edge of each slot tapered to provide cam surfaces 34. The slots 33 are so proportioned, as to receive overhanging lugs 35 formed on the bearing housing. When the slots of the member 32 are fitted over the lugs 35, the cam surfaces 34 may be forced between the rubber washer 30 and the under surfaces of the overhanging lugs 35 by rotating the member 32 in a counterclockwise direction.

This movement of the member 32, moves the slots 33 out of register with the lugs 35 an compresses the resilient washer 30, thereby exerting firm pressure against the metal washer 29. The felt washer 31 is likewise compressed so as to fit the shaft 17. The rubber washer 30 and likewise the felt washer 31, being compressed during the application of the retaining member resist any tendency that the vibration of the apparatus and other disturbing influences may have to rotate the retaining member in either direction from its applied position.

Each of the bearings for the shaft 17 is lubricated, preferably, by means of a suitable syringe or other device of this character for forcing lubricant into the bearing housing through an opening 36. After sufficient lubricant has been applied, the opening 36 may be closed by a suitable screw plug 37. The felt washer 31, fitting the shaft 17, prevents the lubricant from seeping out between the shaft and washer and also prevents dust or the like from entering the bearing housing.

The rollers 14 for supporting the upper strand of the belt are each provided with recesses in their hubs 38 in which are fitted a pair of ball-bearings and closure washers which are, preferably, identical in construction and operation with the bearings and the retaining members described in connection with the lower set of rollers, the overhanging lugs 35$^b$, in this construction, being formed on the hub of the roller 14. The various elements of these bearings corresponding to the same elements of the bearings for the lower set of rollers are indicated by the same reference numerals with the exponent letter "b" and will not be further described in detail.

The rollers 14 preferably five in number, though obviously any desired number may be used—are arranged at suitable angles to each other to impart the desired trough contour to the belt. These rollers are, preferably, of cylindrical formation and are mounted to be separately rotatable on stub shafts or spindles 39 and 40. Each stub shaft is provided with a thrust shoulder 41 against which the inner ball race 25$^b$ abuts, so as to minimize lateral motion of the rollers 14. These stub shafts are cast integral with bearing brackets 42, which brackets are bolted or suitably secured to an adjustable frame member 43.

The frame member 43 consists, preferably, of an inverted channel bar having its ends bent upwardly at an angle corresponding approximately to the inclination of the end rollers, and these ends are secured to the upper ends of brackets 18$^a$—18$^a$ with capacity for pivotal adjustment, whereby the entire upper set of rollers may be swung in a direction longitudinally of the belt. The brackets 18$^a$—18$^a$ are secured to the channel members 11 by means of bolts 20 which extend through elongated openings 19$^a$—19$^a$ in the brackets. This means of attachment permits the brackets 18ª—18ª to be adjusted longitudinally of the frame members and thereby permits either end of the upper set of rollers to be so adjusted as to insure the true running of the belt. The pivoted arrangement of the upper set of rollers makes it possible to vary the depth of the trough by tilting the upper set of rollers. The means for supporting the upper set of rollers with capacity for pivotal adjustment consists, preferably, of brackets 44—44 attached to the opposite ends of the channel 43 and pivotally supported on the studs 45—45 formed on the upper ends of the brackets 18ª—18ª. The lower portion of the brackets 44—44 are provided with arcuate slots adapted to receive bolts 46—46 which when tightened clamp the upper set of rollers in any desired adjusted position.

The bearings of the upper set of rollers are preferably supplied with lubricant by forcing the lubricant through conduits 47 in the stub shafts 39—40 which register with similar conduits 48 formed in the hub portion of each roller 14. The space between the adjacent ends of said ducts provides a lubricant passage leading from the conduits 47—48 to the balls 24ᵇ of each bearing.

The drawings illustrate but one set of rollers for supporting the upper strand of the belt and likewise one set of rollers for supporting the lower strand of the belt. It is obvious, however, that more than one set of such rollers are ordinarily employed in the construction of each trough belt conveyer. The number of sets of such rollers will of course depend upon the length of the conveyer as well as the weight of the material which the conveyer is intended to transport from one place to another.

While the invention is illustrated in one preferred embodiment, it will be obvious that certain modifications in the structure illustrated might be made without departure from the spirit of the invention which contemplates all such changes as come within the scope of the appended claims.

I claim:

1. In a conveyer apparatus, the combination with a flexible belt of a main frame, a plurality of angularly disposed revoluble members for supporting the belt, a transverse frame member on which said revoluble members are supported, brackets longitudinally adjustable on the main frame, and brackets depending from the transverse frame and pivotally secured to the first mentioned brackets, whereby the angularly disposed revoluble members may be adjusted longitudinally of the belt and also rotatably adjusted about a transverse horizontal axis.

2. In a conveyer apparatus, the combination with an endless belt, of a main frame, hanger brackets secured at one end of such frame, bearings fixedly held in the free ends of said hangers, a shaft journaled in said bearings, means on the shaft for supporting one strand of the belt, and adjusting means for moving the free ends of the hangers along a curved path transversely of said belt to effect an alignment of said bearings with such shaft.

3. In a conveyer apparatus, the combination with an endless belt, of a main frame, hanger brackets secured at one end to said frame for adjustment longitudinally of the belt, bearings fixedly held in the free ends of said hangers, a shaft journaled in said bearings, means on the shaft for supporting one strand of the belt and means for adjusting the free ends of the hangers transversely of said belt toward or from one another to effect an alignment of said bearings with said shaft.

4. In a conveyer apparatus, the combination with an endless belt, of a main frame, hanger brackets depending from said frame, bearings fixedly carried by the free ends of said hangers, a shaft journaled in the bearings, rollers on said shaft for supporting one strand of the belt, means for adjusting the free ends of the hangers transversely of the belt toward or from one another to effect an alignment of said bearings with the shaft, means for supporting the other strand of the belt comprising a plurality of angularly disposed rollers, a frame on which said latter rollers are mounted, means for supporting said frame from said main frame whereby the angularly disposed rollers may be adjusted rotatably about a transverse horizontal axis, and means whereby both sets of said rollers may be individually adjusted longitudinally of the belt.

FRANK JONES.